Aug. 16, 1938.  G. A. TINNERMAN  2,127,072
GRILLE FASTENER AND INSTALLATION THEREOF
Filed Feb. 17, 1937
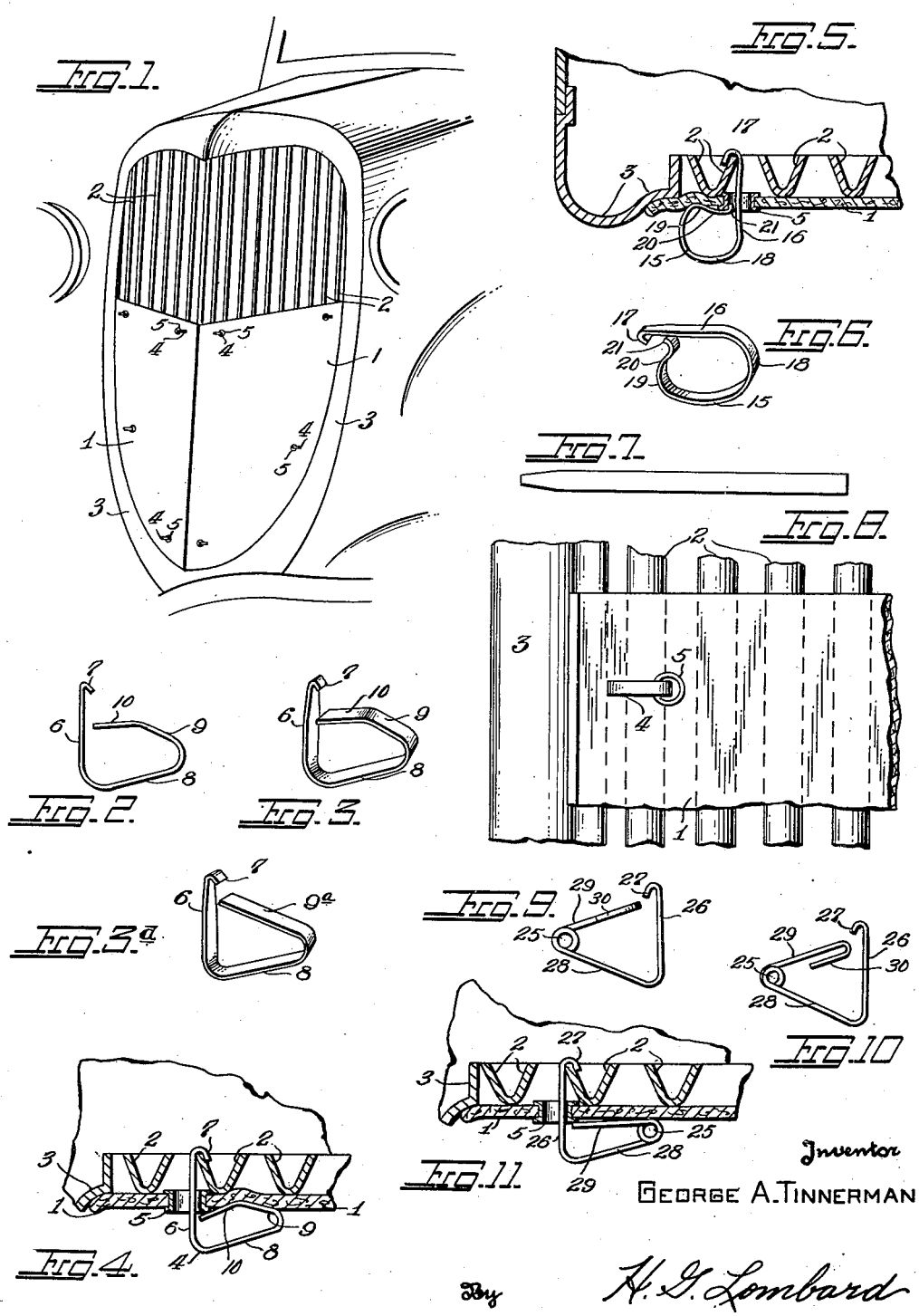
Inventor
GEORGE A. TINNERMAN
By H. G. Lombard
Attorney Patented Aug. 16, 1938

2,127,072

UNITED STATES PATENT OFFICE 2,127,072

GRILLE FASTENER AND INSTALLATION THEREOF

George A. Tinnerman, Rocky River, Ohio, assignor to Albert H. Tinnerman, Cleveland, Ohio Application February 17, 1937, Serial No. 126,265

1 Claim. (Cl. 24—73)

This invention relates to fasteners and particularly clip devices designed for yieldably retaining and detachably securing superposed parts in frictional engagement.

More particularly this invention deals with improved clip fasteners having a spring element which is adapted by its compression to yieldably clamp, and detachably secure a fabric or pliable covering such as in insect screen, guard, cover or shield over the front of an automobile radiator or radiator grille.

It is customary to protect an automobile radiator during freezing weather by attaching to the grille, or directly over the radiator front, particularly the lower portion thereof, a shield or guard in the form of a covering intended to prevent freezing of the cooling solution in the radiator by reducing the effective radiating surface thereof, thus keeping the temperature of the motor at the temperature best suited for efficient operation. Likewise, for summer driving it is customary to cover the radiator front by attaching to the grille guard, or directly to the radiator, a cover or pliable shield in the form of a wire screen, or the like, intended to ensnare insects, bugs, etc., to prevent the same from entering and becoming lodged in and between the radiator tubes or accumulating under the hood.

A most practical method for attaching a shield or guard to a grille or directly to the radiator, is by employing an attaching device in the form of a clip which may be easily, quickly and conveniently applied to fastening position, and which may be readily detached at will without mutilating, deforming or otherwise injuring the same such that it may be again used in the same or a similar installation. Such type of clips, in general, comprise a shank carrying a hook element adapted to engage the underface of superposed parts which are to be clamped together, and a bearing element having a base adapted to engage the upper face of such parts under compression of a spring element, whereby an axial pull is exerted on the shank to yieldably retain the hook element in applied fastening position. The function of the devices may be said to be analogous to that of a resiliently retained push button, such that the clips are yieldably mounted under tension in applied position, and thus are not subject to loosening, accidental dislodgement or disengagement by reason of continuous vibration and jarring, incident to operation of an automobile.

Heretofore such grille fasteners have, almost universally, been constructed of wire which required an expensive, complicated coil construction in order to provide the base and yieldable head structures for exerting an axial pull on the shank or anchoring element of the device to resiliently retain the same in applied fastening position.

It is therefore an object of this invention to provide a grille fastener and attaching clip which is simple in construction and adapted for quickly and conveniently applying a fabric shield, pliable covering, screen, guard or the like to the grille or radiator front of an automobile.

A further object is to provide an attaching clip comprising a simple, resilient head structure including a yieldable spring bearing element designed to be compressed on application to fastening position, whereby adaptability of the devices to various shapes and sizes of grille bars is obtained, and a most effective clamping means for easy, quick engagement and ready disengagement from a grille, radiator, or the like, is provided.

Another object of the invention is to provide a simple, inexpensive, resilient type of grille fastener and attaching clip, which is most economical in manufacture, and which has all the holding qualities and efficiency in operation of the more expensive grille fasteners of the known prior art structures now in use.

Other objects, and new and novel features of the invention will be apparent to those skilled in the art as a description thereof proceeds with reference to the several views of the accompanying drawing, in which like reference characters designate like parts throughout the same, and in which:

Fig. 1 is a diagrammatic perspective view of an automobile front, illustrating a radiator cover or screen held in position over the lower front of a radiator grille by a plurality of the improved attaching clips of this invention.

Fig. 2 is an elevational view of a form of the resilient grille clip per se.

Fig. 3 is a perspective view of the improved clip device shown in Fig. 1.

Fig. 3a is a perspective view of an alternate construction.

Fig. 4 is a sectional plan view of a radiator grille assembly illustrating the use of the clip device shown in Figs. 1 and 2 for detachably securing a cover, screen or the like.

Fig. 5 is a similar view showing applied to fastening position, a modified form of clip device.

Fig. 6 is a perspective view of the modified clip device shown in the installation represented in Fig. 5.

Fig. 7 illustrates a blank outline from which the clip devices shown in Figs. 2–6 inclusive may be constructed.

Fig. 8 is a fragmentary front elevational view of a radiator grille assembly showing the installation represented in Fig. 5.

Fig. 9 is an elevational view of a modified form of clip device.

Fig. 10 is a top perspective view of the modification illustrated in Fig. 9.

Fig. 11 is a sectional view of a radiator grille assembly disclosing the application of the modification represented in Figs. 9 and 10.

As illustrated in Fig. 1, a radiator grille cover 1 in the form of a guard, shield, screen, or the like, of suitable material, is preferably patterned in a predetermined design and outline to lie flush with the outer surface of the radiator front or radiator grille defined by grille bars 2 and to seat snugly within the framing of the radiator shell 3. The cover or screen 1 is held in place by a plurality of suitably disposed, resilient, attaching clips 4 connected to the grille bars 2 and yieldably engaging the cover or screen to clamp the same in frictional engagement in desired position on the grille or radiator front itself. Any number of attaching clips sufficient to properly hold the cover or screen in place may be employed; preferably the clips are determinately spaced about the margin of the cover or screen and are applied through apertures suitably disposed for most effectively mounting a cover or screen of predetermined shape and design depending on the size and type of the radiator grille.

As shown in Fig. 4, apertures in the cover or screen 1 may be provided by eyelets 5, or the like, riveted onto either side of the material comprising the cover or screen, to prevent the perforation in the material from becoming enlarged, frayed or torn by continued use, thereby extending the life of the cover or screen.

In general the fasteners of this invention are in the form of, what may be termed, clips, each comprising a shank carrying a hook element adapted to engage the innerface of a part or object to become anchored therewith, and a resilient, compressible spring element serving as the head member yieldably engaging the outerface of a superposed part or object to frictionally clamp and retain the same in fixed relation to the first named part.

In the preferred embodiment of such a fastener, Figs. 1, 2 and 4, the clip 4, includes an elongated shank 6, carrying a hook 7 at its free end designed for engagement with the rear edge of a supporting element such as the side wall of a grille bar 2, Fig. 4. At its opposite end the elongated shank 6, is provided with a resilient head member in the form of a yieldable, compressible, spring element comprising a base 8, and a spring bearing arm 9, relatively yieldable with respect thereto. Preferably the spring bearing arm 9 has a portion thereof bent out of its plane to provide, what may be termed, a substantial wedging element to facilitate snug seating of the device in accordance with the contour of a member having an irregular surface, or in the space between members disposed in spaced relation, substantially as shown in Fig. 4, and as hereinafter more fully set forth.

As shown in Fig. 3a, in an alternate construction, the spring bearing arm 9a, extends in a plane disposed at an angle to the base whereby to seat flush with a substantially flat supporting surface for most effective engagement therewith.

In use, this form of clip is applied to fastening position by a compression of the spring element through pressure applied to the base 8, to move the same relative to the spring arm 9, and effect an axial movement of the shank 6 to engage the hook element 7 with a supporting member. Thus the yieldable construction of the head member adapts the fastener for clamping members of various thicknesses and maintains the device in resilient engagement in fastening position, whereby vibration and jarring do not materially alter the initial application thereof, or affect the holding qualities of the device over long periods of use.

The foregoing features and advantages of such fasteners may be more clearly understood by considering practical applications of the various forms of clip devices.

Referring to Fig. 4, an installation is shown wherein a fastener of the form described in connection with Figs. 2 and 3 is employed in an automobile radiator grille assembly composed of grille bars 2, each consisting of side walls in the form of a substantial channel shape. A radiator cover or screen 1 is applied to the grille front and is detachably secured to the bars at one or more points by a form of clip fastening means. In order that such fastening means be accepted by the trade, it is essential that they be simple, extremely easy to apply, readily disengaged and removed at will, and not subject to dislodgment due to the continuous vibration and jarring of the radiator and grille incident to operation of the automobile. The clip device of Figs. 2 and 3 is admirably suited for such use and fulfills these essentials most effectively.

In the installation shown, a cover or screen may be readily secured on a radiator or grille by holding the same in desired position with one hand and applying the clip device with the other. In applying the clip, the spring arm 9 is disposed against the cover or screen 1, with the elongated shank 6, and hook 7, disposed approximately over an aperture in the cover or the opening provided by the eyelet 5. On applying pressure to the base 8, the head structure will be compressed to cause a movement of the shank 6 through the eyelet opening sufficient to permit the hook 7 to overlie the rear edge of the adjacent side wall of a grille bar 2. Then, upon release of pressure on the base 8, the head member is free to expand toward its normal, untensioned configuration whereby an automatic axial pull is exerted on the shank to cause fastening engagement of the hook 7 with the rear edge of the side wall of the grille bar, to frictionally retain the cover or screen, and clamp the same between the spring arm 9 and the outer surfaces of the grille bars or radiator front. Since the head of the clip fastener is of the yieldable or resilient type, once the device is properly engaged, it will not be affected by the continuous vibration of the grille or radiator incident to operation of the automobile; that is, the clip device is in continuous, yieldable engagement in fastening position and is not subject to loosening by vibration as a screw, nut, or other positive type of fastening means. Also, by reason of the yieldable or resilient head structure, the device is readily adapted for use in installations and assemblies of various thickness and with various sizes and shapes of grille bars.

It is to be noted that the clip device employed in the assembly of Fig. 4 is provided with a spring arm 9, having a portion 10 bent out of its plane to present a substantial wedging surface as more particularly shown in Figs. 2 and 3. Such a wedging surface is advantageous in that it is especially adapted to seat in fastening position in the space between adjacent grille bars, and thus crimp therebetween the material of the cover or screen to obtain a most effective frictional engagement and thereby prevent creeping or lateral movement of the cover or screen from its applied position on the radiator or grille. In the assembly, the wedging surface of the spring arm is instrumental in maintaining the clip device in its applied fastening position with the shank 6 substantially at right angles to the plane defined by the outer surfaces of the grille bars whereby possibility of lateral movement of the shank and accidental disengagement of hook 7 is prevented. The wedging surface of the bearing spring arm is also important in that it solidly seats the head member in fastening position over the space between adjacent grille bars, and thereby eliminates possibility of the head structure collapsing and moving into the aperture or opening presented by eyelet 5, such that the device could become untensioned and accidentally disengaged from assembled relation with the grille bar.

In Fig. 5 is shown a modified construction of clip device involving the use of a loop-type head consisting of a rounded, yieldable, spring bearing arm 19, a bowed portion 15, and an arcuate base element 18 connected to an elongated shank 16, carrying a hook 17. Preferably, the yieldable spring arm is rounded and deformed as at 20 to provide a protruding lug or lip element 21, designed to contact the adjacent corner edge of the aperture, and which together with the rounded portion of the spring arm, provides a seat for snug, rigid engagement of the device with a supporting member having an irregular or rounded surface.

Figs. 5 and 8 disclose a practical application of the clip device represented in Fig. 6. The device is applied in a manner substantially similar to that described in connection with Figs. 2–4 inclusive by exerting pressure on the base 18 to compress the yieldable head member. As shown in Fig. 5 the device is applied with the lip or lug element 21 disposed to engage the adjacent corner edge of the eyelet 5 toward one side surface of the grille bar such that lateral movement of the device in one direction is prevented. Then, on compression of the head member to engage the hook 17 with a rear edge of the grille bar, the deformed portion 20 of the spring bearing arm engages at points directly in line with the front face of the grille bar and toward the opposite side surface thereof, substantially as shown in Fig. 5, thereby preventing lateral movement in an opposite direction, with the compressed major portion of the loop head member projecting beyond and frictionally clamping the cover or screen 1 as illustrated in Fig. 8. Thus the effective deformed portion 20 of the spring arm 19 becomes seated directly in line with the rounded outer surface of the grille bar, whereby the device is rigidly retained in applied fastening position, and possibility of lateral shifting movement and loosening thereof due to vibration is eliminated. In this form of device, considerably more tension is exerted by the spring arm due to the loop construction of the head which tends toward rigidity rather than flexibility as in the clip device shown in Fig. 4. Therefore the clip device in the installation represented in Fig. 5, is admirably suited in situations where the supporting member is of rounded or irregular contour and it is practical to engage the spring arm at points directly in line with the outer surface of such supporting member to obtain a firm, rigid engagement and a positive seating of the device in applied fastening position.

The various forms of clip devices shown in Figs. 3, 3a, and 6, are extremely simple in their constructions, and consequently are most economical in manufacture. Preferably the devices are constructed from a blank substantially as shown in Fig. 7, which blank is severed from a continuously fed strip of suitable width, or stamped from relatively wide stock without loss or waste of material.

Figs. 9 and 10 disclose a modified form of clip device, constructed of wire or the like and embodying the essential teachings and structural features of the devices illustrated in Figs. 2, 3 and 6. This form of clip fastener comprises an elongated shank 26, carrying a hook element 27 at its free end, and a yieldable, compressible head member consisting of a base 28, merging into a convolution 25 extending into a spring arm 29 which is formed into a return bend 30, or any other suitable configuration, to provide a wide bearing area for engaging, at spaced points, a member to be supported or part to be secured.

Fig. 11 represents a practical application of the wire clip device disclosed in Figs. 9 and 10. In the assembly shown, the elongated shank 26 is inserted through an aperture in the cover or screen or through the opening presented by the eyelet 5. Upon pressure being exerted on the base element 28, the shank is moved axially such that the hook 27 overlies the side wall of the grille bar 2. Upon release of pressure, the hook becomes engaged with the rear corner edge of the side wall, whereby the device is yieldably retained in position under tension exerted by the spring arm 29, and a cover or screen interposed between the spring arm and the outer surfaces of the grille bars is frictionally retained in desired position on the radiator grille. In this form of device the bearing spring arm 29 may be disposed in a return bend 30 to provide a wide bearing surface for engaging an extended area of the cover or screen 1 to frictionally retain the same in desired position on the grille or radiator front.

Each of the above described forms of clip fastening devices may be readily disengaged and removed from an assembly by compressing the head member through pressure exerted on the base portion thereof, whereupon the body of the fastener may be turned sufficient to disengage the hook element from the rear edge of the side wall of the grille bar, whereby the shank may be withdrawn and the device removed without deforming, mutilating, or otherwise injuring the same such that it may again be used in the same or a similar installation.

While the invention has been described in detail with specific examples, such examples are illustrative and are not given as limitations, since other modifications within the spirit and scope of the invention will be apparent to those skilled in the art. Hence, the invention is to be understood as limited only as indicated in the appended claim, in which the intent is to set forth all the novelty over the prior art.

What is claimed is:

For detachably securing a protective covering to a radiator grille comprising spaced grille bars, a clip device comprising a single, integral piece of metal strip stock having a bent portion providing an elongated shank and a compressible head member for yieldably engaging said protective covering, said shank having a return bend at one end providing a hook for engaging a grille bar side wall and said head member comprising a base extending from the other end of said shank in the same general direction as said hook and having a bend providing an extension serving as a resilient bearing arm, said bearing arm being disposed intermediate said hook and base and extending toward said shank but out of contact therewith, whereby said shank and head members are adapted for independent free movement with respect to each other to compensate for irregular bearing surfaces in the grille bar and covering secured thereto, said bearing arm having a bend providing a wedging element for more effectively retaining the area of the covering engaged thereby in mounted position on the irregular surface of the grille bar.

GEORGE A. TINNERMAN.